Oct. 14, 1958 T. J. WILSON 2,856,140
APPARATUS FOR RADIO CONTROL OF AIRCRAFT PATH
Filed Dec. 6, 1952 2 Sheets-Sheet 1

INVENTOR
THEODORE J. WILSON
BY
George H. Fisher
ATTORNEY

United States Patent Office 2,856,140
Patented Oct. 14, 1958

2,856,140

APPARATUS FOR RADIO CONTROL OF AIRCRAFT PATH

Theodore J. Wilson, Minneapolis, Minn., assignor to Minneapolis-Honeywell Regulator Company, Minneapolis, Minn., a corporation of Delaware Application December 6, 1952, Serial No. 324,465

10 Claims. (Cl. 244—77)

This invention relates to the field of aircraft instruments, and more specifically to improved navigating equipment for automatically causing an aircraft to follow a selected path which may be one of a plurality of such paths identified by their several directions from a point of destination.

In automatic control of aircraft it is well known to manually control the craft in accordance with signals from an omni-bearing transmitter, which signals are interpretable in a flying craft in terms of the bearing of the craft from the transmitter. By controlling the craft so that a constant bearing is maintained, the craft is caused to fly in a straight-line toward the transmitter irrespective of crosswinds.

The output of the omni-bearing receiver carried by the craft is a direct voltage which varies in magnitude and reverses in polarity with the amount and sense of any departure of the craft from the selected path or "radial" from the transmitter. Means are known in the art for causing an aircraft to automatically follow a localizer path of this general type, by means of a coupler supplying the receiver signals to an automatic pilot in such a manner as to return the craft to the localizer path whenever it departs therefrom.

Such an arrangement has the disadvantage that control is not exerted to return the craft to the path, if it turns to depart therefrom, until the departure is of sufficient magnitude to give a signal greater than the threshold level of the apparatus. Any change in heading of the craft is in no way sensed or corrected until its result in the form of deviation of the craft desired path has assumed significant proportions. In connection with the well known instrument landing system it has been proposed to overcome this by using the directional gyroscope of the automatic pilot to stabilize heading, rather than caging the gyroscope, and either precessing the directional gyroscope or opposing its signal by another, from a steering motor for example, in accordance with the integral of the path error, to prevent the directional gyroscope from destroying the usefulness of the path signal. More recently it has been proposed to make this correction in accordance with change in the heading of the craft, measured as integrated roll angle.

The expedients just described are not sufficient when it is desired to follow an omni-bearing path rather than a localizer path, first because means must be provided for selecting some one particular desired path bearing according to the geography of the airport of destination, and second because apparatus of the prior art type, if adjusted for one particular path bearing, is not properly operative for any different path bearing. Moreover, it has been found that more satisfactory correction of the off path deviations of the craft resulting from heading changes can be made if the correcting signal is made proportional to a characteristic of the heading error itself, rather than being made proportional to some secondary variable more or less closely related thereto. The specific characteristic found most desirable is the rate of change of heading error, and the present invention embodies means for making correction of the path error controlling mechanism in accordance therewith.

It is thus a broad object of the invention to provide means for automatically controlling an aircraft so that it follows a desired path.

Another broad object of the invention is to provide means for automatically controlling an aircraft so that it follows a selected radial to an omni-bearing transmitter.

Another object of the invention is to provide means for automatically controlling an aircraft in accordance with its deviation from a selected path and from a selected heading.

A further object of the invention is to provide means for automatically controlling an aircraft in accordance with its deviation from a selected path and with the rate of change of the deviation of the aircraft from a selected heading.

A still further object of the invention is to provide means as described above in which the directions of the selected path and the selected heading are parallel and are simultaneously selected.

Yet another object of the invention is to provide means as described above in which the control exerted by the heading error is effective only while that error is changing.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention. In the drawing:

Figure 1:
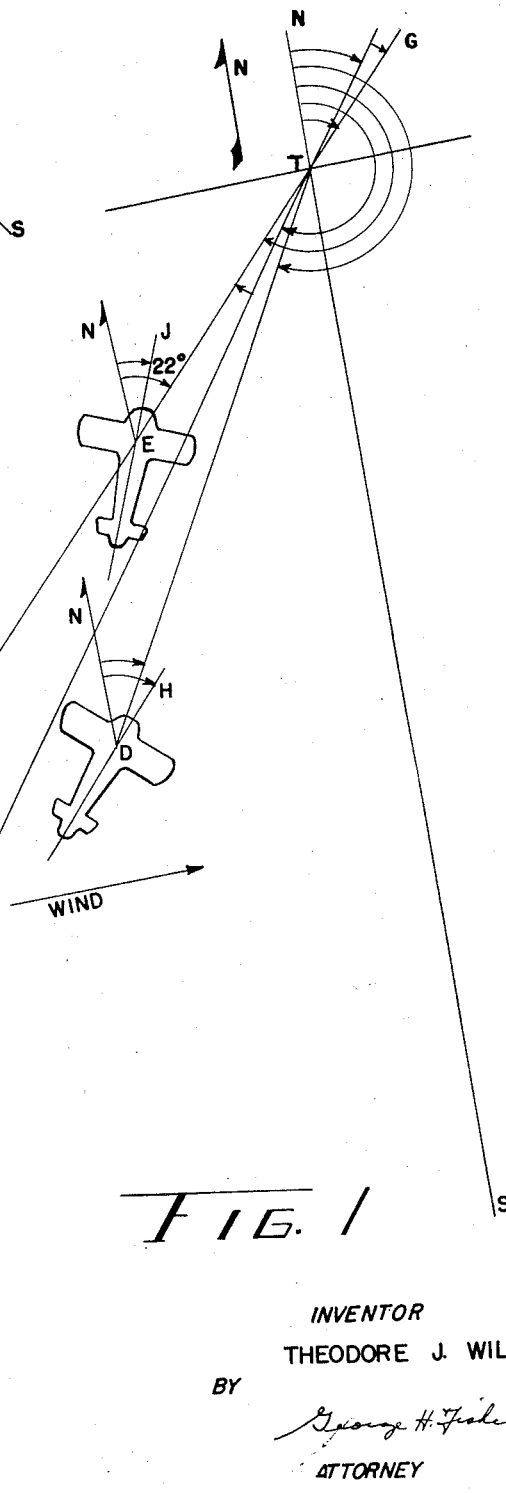
Figure 1 is a diagram illustrating a desired mode of operation of the invention.

Referring now to Figure 1, an omni-bearing transmitter is shown at the point T, and the cardinal compass directions at the point T are shown. Assume that it is desired for an aircraft to approach station T along a selected path AT, at any point along which the bearing of the craft from the transmitter has the value of 224°. This bearing angle is shown at NTA. A craft attempting to come on to the desired path may be at some position B, where its bearing from the transmitter is NTB and its heading is NBF. The heading of an aircraft flying along the path AT in the absence of any cross wind component is 180° different from NTA, and is indicated at NTG: the pilot can determine this angle by inspection once he has determined what radial he wishes to follow. He may now manually direct the craft to some position C where it has the heading NCG which equals NTG as sensed by his compass, and where its bearing NTC is the same as NTA, as sensed by his omni-bearing receiver. In the absence of disturbing factors, the craft can now follow the path to T under control of the automatic pilot.

Disturbing factors are always present, however. Let a wind be assumed to be blowing from the west at 40 miles per hour, for example, as suggested by the wind vector in the drawing. Under the influence of this wind, the craft, although it may maintain its heading, is blown off the desired path to some point D where its bearing from T is NTD, and its heading NDH. In order for the craft to remain on the line AT when returned thereto, in the presence of this wind, it must be given a crab angle determined by the heading and airspeed of the craft, the direction and intensity of the wind, and the direction of the path. For an airspeed of 110 miles per hour and other data as just set out above, the crab angle is 22°. The apparatus herein described is designed to cause a craft to assume a position and heading such as that shown at E, where its bearing NTE from the station is the same as NTA, and where its heading NEJ remains constant at the proper value to maintain movement on the path. The heading angle NEJ required differs from the original heading NET by a crab angle TEJ of 22°.

Figure 3:
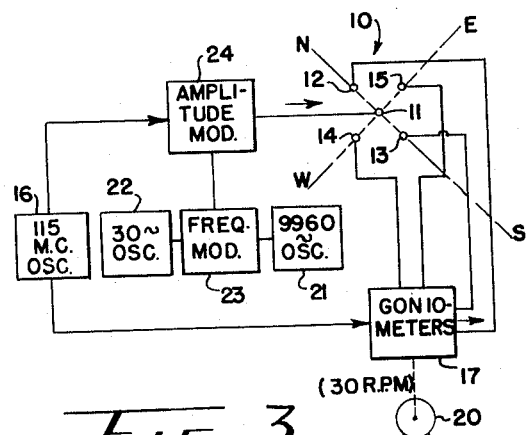
Figure 3 shows schematically the general nature of an omni-bearing transmitter.

According to the present invention, the bearing of the craft from station T is given by the omni-bearing apparatus in a known fashion, and will be only briefly reviewed here. Figure 3 illustrates the transmitter of such apparatus, and shows an array 10 of antennas including a first antenna 11, a first pair of further antennas 12 and 13, and a second pair of further antennas 14 and 15. The latter four antennas are symmetrically arranged about antenna 11 as a center, antennas 12 and 13 being equally displaced from it in a north and south direction, and antennas 14 and 15 being equally displaced from it in an east and west direction. Antennas 12 through 15 are energized from a 115 megacycle oscillator 16 through a set of goniometers 17 which are driven by a motor 20 at a speed of 30 revolutions per minute. The phase relation between the voltages appearing on these four transmitters is such that at a distant point the signal received from them jointly appears to have an amplitude modulation of 30 cycles per second impressed on the carrier oscillation of 115 megacycles per second.

The transmitter also includes an oscillator 21 having a frequency of 9960 cycles per second, and a source 22 of alternating voltage having a frequency of 30 cycles per second synchronized with the rotation of goniometers 17. In a frequency modulator 23 the 9960 cycle oscillation is frequency modulated by the 30 cycle oscillation, and the output of modulator 23 is fed to an amplitude modulator 24, in which it is applied to amplitude modulate a second output from the 115 megacycle oscillator. The output from amplitude modulator 24 is impressed on antenna 11 from which it is radiated in a non-directional fashion.

Figure 2:
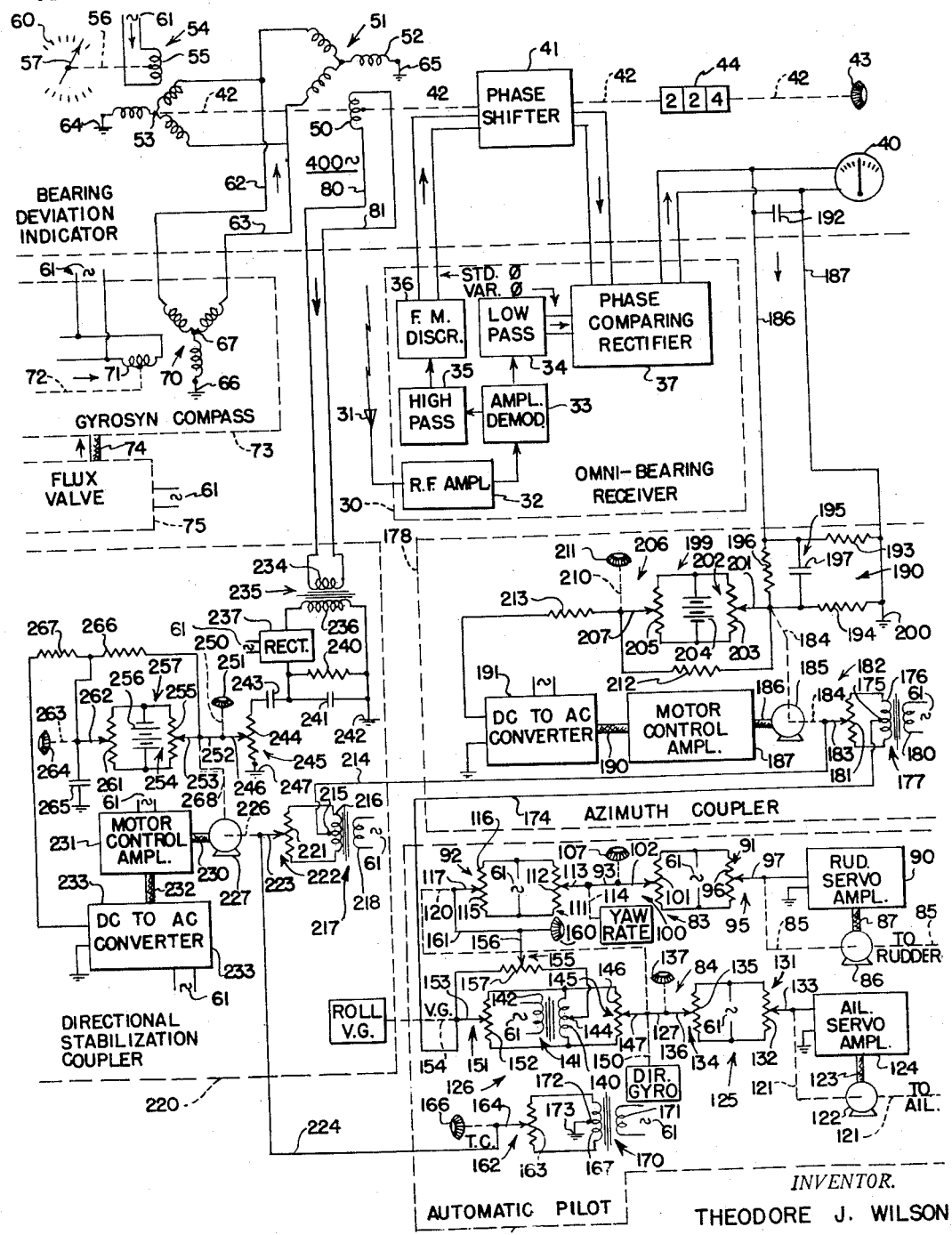
Figure 2 is a schematic dagram showing apparatus for carrying out the invention.

The airborne omni-bearing receiver comprises a portion of the present invention, and is shown inclosed within the block 30 in Figure 2. The signal sent out from antennas 11 to 15 appears on a receiving antenna 31 and after passing through a suitable radio frequency amplifier 32 and such intermediate frequency amplifiers as may be considered desirable it is impressed on an amplitude demodulator 33. The output of demodulator 33 comprises a first component, having a frequency of 30 cycles per second, derived from the combined radiation from antennas 12, 13, 14, and 15, and a second component, having a frequency of 9960 cycles per second, which is frequency modulated. The demodulator output is impressed on a pair of filters 34 and 35, the former being a low pass filter which transmitts the 30 cycle component and attenuates the 9960 cycle component, and the latter being a high pass filter which transmits the 9960 cycle component and attenuates the 30 cycle component. The output of high pass filter 35 is supplied to a frequency modulation discriminator 36, which derives from it the 30 cycle modulation originally impressed on it by oscillator 22 in the transmitter.

The outputs from low pass filter 34 and discriminator 36 are fed to a phase comparing rectifier 37 which gives at its output terminals a unidirectional voltage of varying magnitude and reversible polarity, the output voltage being of one polarity or the other depending on which of the two input voltages has a leading phase. The output from rectifier 37 is indicated by a center zero meter 40 which moves in one direction or another away from its center position according as the output of the rectifier is of one polarity or the other, to an extent determined by the magnitude of the output.

The connection between low pass filter 34 and rectifier 37 is direct. The connection between discriminator 36 and rectifier 37 includes a phase shifter 41 actuated through a mechanical connection 42 by a manual knob 43. An indicator 44 operable from zero to 360° is actuated by connection 42 to make evident the amount of adjustment of phase shifter 41. The initial setting is so made that if the craft is located on the radial of zero degrees from a transmitter, and if indicator 44 is at zero, the phase relationship between the two inputs to rectifier 37 is such that the rectifier supplies no output and meter 40 is at its center zero position.

Also actuated by operation of mechanical connection 42 is the rotor 50 of a self-synchronous device 51 having a fixed three phase stator winding 52. Mechanical connection 42 is further extended to rotate the three phase winding 53 of a further self-synchronous device 54, whose single phase winding 55 is mounted for rotation independently of winding 53 on a shaft 56 carrying an index 57 for rotation with respect to a scale 60.

Single phase winding 55 is energized with alternating voltage from a suitable source 61. Three phase windings 52 and 53 are energized, through conductors 62 and 63 and ground connections 64, 65, and 66, from the three phase winding 67 of a further self-synchronous device 70 having a single phase winding 71 energized from source 61 of alternating voltage and rotated by a mechanical connection 72. Device 70 is a part of a conventional "Gyrosyn" compass, 73, mounted in the aircraft and controlled through a cable 74 in accordance with the output of a "flux valve" 75 which also has an input from source 61. Flux valve 75 and Gyrosyn compass 73 are both well known in the art, and it need only be said that rotor 71 is positioned with respect to stator winding 67 in accordance with the magnetic heading of the aircraft as sensed by flux valve 75. Device 70 accordingly acts as a telemetric transmitter, and device 54 acts as a receiver to position index 57 with respect to scale 60 in accordance with the heading of the aircraft.

Device 51 acts as a control transformer, supplying from single phase winding 50 a voltage on conductors 80 and 81 which is determined by the positions of rotors 71 and 50 with respect to stators 67 and 52; when the rotors are in identical positions with respect to the stators, no output appears on conductors 80 and 81: if the actual heading of the craft as sensed by flux valve 75 is not that selected by operation of knob 43, a voltage appears on conductors 80 and 81 which is of one phase or the other depending on the direction of departure of the heading of the aircraft from the selected heading, and of an amplitude which depends on the amount of this departure.

One detail should be pointed out at this time. It will be obvious that an aircraft in the absence of wind flying along the radial AT toward T has a heading not NTA, but NTG. To compensate for this discrepancy, rotor 50 is fixed to shaft 42 in a 180° displaced position from that which it would have if the heading of the craft and its bearing from the transmitter were the same.

In the lower right hand corner of Figure 2 there is shown an automatic pilot 82 having a rudder channel 83 and an aileron channel 84. The rudder of the craft is actuated through a mechanical connection 85 by a rudder servomotor 86 energized through a cable 87 from a rudder servo amplifier 90. The input to rudder servo amplifier 90 includes a first bridge 91 and a second bridge 92, connected in series by conductor 93. Bridge 91 is continuously energized with alternating voltage from source 61 and comprises a first voltage divider 95 having a winding 96 and a slider 97, and a second voltage divider 100 having a winding 101 and a slider 102. Slider 97 is connected to amplifier 90, and is adjusted through mechanical connection 85 by motor 86. Slider 102 is connected to conductor 93, and is actuated by a manual rudder trim adjusting knob 107. Bridge 92 is continuously energized with alternating voltage from source 61, and is shown to comprise a first voltage divider 111 including a winding 112 and a slider 113 actuated through a mechanical connection 114 by a yaw rate gyroscope, and a second voltage divider 115 including a winding 116 and a slider 117 actuated through a mechanical connection 120 by a directional gyroscope.

The ailerons of the craft are actuated through a mechanical connection 121 by an aileron servomotor 122, energized through a cable 123 from an aileron servo amplifier 124. Amplifier 124 is energized from a pair of bridges 125 and 126 connected in series by a conductor 127. Bridge 125 is continuously energized with alternating voltage from source 61, and comprises a first voltage divider 131 including a winding 132 and a slider 133, and a second voltage divider 134 including a winding 135 and a slider 136. Slider 133 is adjusted through a mechanical connection 121 by aileron servo 122. Slider 136 is adjusted by an aileron turn adjusting knob 137. Bridge 126 continuously is energized from the secondary winding 140 of a transformer 141 having a primary winding 142 energized from source 61; secondary winding 140 is center tapped at 144. Bridge 126 includes a first voltage divider 145 including a winding 146 and a slider 147 actuated through a mechanical connection 150 by the directional gyroscope of the craft, and a second voltage divider 151 including a winding 152 and a slider 153 actuated through a mechanical connection 154 by the roll axis of the vertical gyroscope of the craft.

A voltage divider 155 is shown to have a slider 156 and a winding 157 connected between slider 153 and center tap 144. Slider 156 is adjusted by a turn coordination knob 160, and is connected by conductor 161 to slider 117.

Automatic pilot 82 also includes a further voltage divider 162 having a winding 163 and a slider 164 actuated by a turn control knob 166. Winding 163 is energized from the secondary winding 167 of a transformer 170 whose primary winding 171 is energized from source 61; secondary winding 167 is center-tapped at 172, and the center tap is grounded at 173.

In the normal automatic pilot slider 164 is connected to slider 153. The directional movement of the craft is controlled by the human pilot, either by personal operation of the control surfaces or by operation of turn control knob 166, to maintain the craft on the desired radial from the transmitter as indicated by meter 40, the actual heading of the craft being given by index 57 on scale 60. In the practice of the present invention, on the other hand, the normal connection between slider 153 and slider 164 is removed, and slider 153 is connected by a conductor 174 to a center tap 175 on the secondary winding 176 of a transformer 177 having a primary winding 180 energized from source 61. Transformer 177 is located in an azimuth coupler 178. Energized from secondary winding 176 of transformer 177 is the winding 181 of a voltage divider 182 whose slider 183 is adjusted through a mechanical connection 184 by a servomotor 185. Motor 185 is energized through a cable 186 from a motor control amplifier 187, which is in turn energized through a cable 190 by the output of a D. C.-to-A. C. converter 191. Converter 191 is energized in accordance with the signal being supplied to meter 40, as will now be described.

The voltage supplied to meter 40 is applied through a pair of conductors 186 and 187 to the rate network 190 of azimuth coupler 178; a large capacitor 192 is connected across the conductors at meter 40 to filter out undesirable transients. Rate network 190 includes an input resistor 193, an output resistor 194, and a rate insertion network 195 including a resistor 196 and capacitor 197. One terminal of output resistor 194 is grounded at 200; the other is connected to the slider 201 of a voltage divider 202 whose winding 203 is energized from a source 204 of unidirectional voltage. Also energized from source 204 is the winding 205 of the voltage divider 206 whose slider 207 is arranged for actuation through a mechanical connection 210 by a centering knob 211. Voltage dividers 202 and 206 comprise a bridge 199 energized from source 204. A resistor 212 is connected between slider 207 and slider 201, the latter being actuated through a continuation of mechanical connection 184 by motor 185. Slider 210 is connected through an isolating resistor 213 to converter 191.

The input to converter 191 is thus seen to comprise two series-added voltages, the first appearing across resistor 212 and the second appearing across resistor 194. The latter voltage depends on the signal being supplied to meter 40, and the former voltage comprises the output from bridge 199, which may be adjusted by operation of motor 185. Amplifier 187 energizes motor 185 to operate until slider 202 is adjusted to such a position that the bridge output voltage impressed across resistor 212 is exactly equal and opposite to the voltage across output resistor 194. When this takes place, operation of motor 185 ceases. The operation of the motor has, however, adjusted slider 183 to some position on winding 181, and if this position is not the center of the winding, a voltage appears between center tap 175, that is between slider 153, and slider 183. The amplitude of this voltage is proportional to the voltage at meter 40, and hence is proportional to the bearing error of the aircraft. This voltage is supplied through a circuit presently to be described to the aileron and rudder channels of the automatic pilot, and accordingly alters the heading of the craft to cause it to attempt to follow the selected radial.

Slider 183 is connected through conductor 214 to a center tap 215 on the secondary winding 216 of a transformer 217, the primary winding 218 of which is energized from source 61. Transformer 217 comprises a component of a directional stabilization coupler 220 shown on the lower left portion of Figure 2. Energized from secondary winding 216 of transformer 217 is the winding 221 of a voltage divider 222 whose slider 223 is connected by a conductor 224 to slider 164 in the automatic pilot. As long as slider 223 is at the center of its winding, any voltage appearing between slider 183 and center tap 175 of azimuth coupler 178 is impressed between sliders 153 and 164 of automatic pilot 82 and acts in exactly the same fashion as would a voltage resulting from displacement of slider 164 along its winding from its normal central position.

As mentioned above, it is desirable to modify the control of the autopilot from the bearing deviation indicator just described, in accordance with the rate of change of heading error of the aircraft; this is accomplished in directional stabilization coupler 220. Slider 223 is adjusted through a mechanical connection 226 by a servomotor 227 which is energized through a cable 230 by a motor control amplifier 231 drawing its power from source 61. Amplifier 231 is energized in turn through a cable 232 from a D. C.-to-A. C. converter 233 which also derives power from source 61.

The input to converter 233 is derived from conductors 80 and 81, which are connected to the primary winding 234 of a transformer 235 whose secondary winding 236 is connected through a phase sensitive rectifier 237 to a load resistor 240. A capacitor 241 connected across resistor 240 filters the alternating component of the rectified voltage. One terminal of resistor 240 is grounded at 242. The other terminal is connected through a large capacitor 243, and the winding 244 of a voltage divider 245 having a slider 246, to ground at 247. Slider 246 is adjustable through a mechanical connection 250 by a ratio knob 251, and is connected through a conductor 252 to the slider 253 of a second voltage divider 254 whose winding 255 is energized from a source 256 of unidirectional voltage and comprises one portion of a bridge 257. The remaining portion of bridge 257 is made up of a second voltage divider having a winding 261 energized from source 256, and a slider 262 actuated through a mechanical connection 263 by a centering knob 264. Slider 262 is connected to ground through a filter capacitor 265, and a resistor 266 is connected between sliders 262 and 253. Slider 262 is connected through an isolating resistor 267 to the input to converter 233. Slider 253 of voltage divider 254 is arranged for operation by motor 227 through a mechanical connection 268.

It will now be evident that the input to converter 233 comprises the series sum of two voltages, that appearing across resistor 266 and that appearing across the portion of winding 244 below slider 246. The former voltage is adjusted by adjustment of slider 253, mechanical connection 226 of motor 227 being extended at 268 for that purpose, and the latter voltage varies in accordance with departure of the heading of the aircraft from that selected by knob 43, as modified by capacitor 243. The effect of this capacitor is to supply voltage to voltage divider 245 only so long as the heading error of the aircraft is changing, since only changing voltages are conducted through a capacitor. It thus follows that regardless of what the actual heading error of the aircraft is, only so long as that error is changing will any voltage be applied to voltage divider 245. When any voltage is applied to voltage divider 245, motor 227 is energized, and adjusts slider 253 until the voltage drop across resistor 266 is equal and opposite to that between slider 246 and ground. When this condition is attained, operation of motor 227 ceases. The operation of the motor has however, displaced slider 223 from its central position on winding 221, and this in turn results in the appearance of a voltage between slider 223 and center tap 215.

It is thus evident that there may appear between sliders 153 and 164 of automatic pilot 82 two voltages, that between slider 183 and center tap 175 in azimuth coupler 178, and that between slider 223 and center tap 215 in directional stabilization coupler 220, and that the rudder and aileron channels in the automatic pilot are affected by this sum.

Operation

The mode of operation of my invention will now be really apparent. At the time when the airplane is at the point B it may for example be proceeding under manual control by the human pilot, who operates the ailerons and rudder of the craft by means of the control stick and rudder pedals in the usual fashion, in accordance with the indications of meter 40 and index 57 after having operated manual knob 43 to set indicator 44 at the desired radial along which he wishes to approach the station. Index 57 indicates the angle FBK which is the difference between the angle NBK which the craft should have and its actual angle NBF. Similarly, meter 40 is deflected from its central zero position to give a reading corresponding to the angle ATB which is the bearing deviation of the craft from its desired path. As the flight continues, the indication of meter 40 becomes smaller and smaller, and when it is nearly zero the human pilot turns the craft in the general direction of the transmitter at the station T, reducing the indication of index 57 as well. The automatic pilot may now be made effective under the control of signals from Azimuth coupler 178 and directional stabilization coupler 220.

If the craft is on the line AT no signal is being supplied between slider 183 and 175, and if the heading of the craft is not changing no signal is being supplied between slider 223 and center tap 215. Under these conditions, the rudder and ailerons of the craft are stabilized in their present positions by normal operation of the automatic pilot, and the craft continues along the line AT as is desired.

If the craft moves off the line AT, the phase of the signal supplied to low pass filter 34 changes with respect to the phase of the signal supplied through phase shifter 41 and a voltage is supplied to meter 40. This voltage passes through rate network 190 of azimuth coupler 178, and results in operation of motor 185 to change the setting of slider 183, thus producing a voltage between that slider and center tap 175 which is transmitted to the automatic pilot to cause change in the rudder and ailerons of the aircraft in a sense to return the craft to the desired path. The change in heading resulting from the adjustment of the control surface is sensed by flux valve 75, and index 57 is moved to a new position with respect to scale 60; at the same time a signal is supplied along conductors 80 and 81 to directional stabilization coupler 220. Motor 227 in the directional stabilization coupler operates in accordance with the signal between slider 246 and ground, that is, in accordance with the rate of change in the heading angle as transmitted through condenser 243, and the position of slider 223 with respect to winding 221 is adjusted accordingly. A second voltage thus appears between slider 223 and center tap 215, and is added in series with voltage supplied from azimuth coupler 178 to comprise a second input to the automatic pilot. As the heading angle of the craft becomes constant, the signal from the directional stabilization coupler becomes zero, and control solely in accordance with the azimuth coupler signal is restored. By this means a leading or anti-hunt signal is provided in the system which increases its accuracy and the smoothness with which it causes the craft to follow the desired path.

Now consider the case when the craft is on the desired path, but a gust of wind suddenly changes its heading, so that if continued on the new heading it would move off the course. As yet there has been no change in the voltage through meter 40, but the change in heading is sensed by flux valve 75 and transmitted through conductors 80 and 81 to directional stabilization coupler 220. Since the heading of the craft is changing a signal is transmitted through condenser 243 and impressed on motor control amplifier 231, causing operation of motor 227 to displace slider 223 from its position on winding 221, accordingly supplying a signal into the autopilot to correct the change in heading before serious departure from the craft has taken place.

Numerous objects and advantages of my invention have been set forth in the foregoing description, together with details of the structure and function of the invention, and the novel features thereof are pointed out in the appended claims. The disclosure, however, is illustrative only, and I may make changes in detail within the principle of the invention to the full extent indicated by the broad general meaning of the terms in which the appended claims are expressed.

I claim as my invention:

1. Apparatus of the class described comprising, in combination: means giving a first output which varies in accordance with the heading of a dirigible craft; further means connected to said first named means and adjustable in accordance with a selected value of heading of the craft to derive from said first output a second output which varies in accordance with deviation of the heading of the craft from the selected value; means connected to said further means for supplying a first signal which varies in accordance with the changing component only of said second output; means giving a second signal which varies in accordance with departure of the craft from a predetermined path; and means connected to said two last named means for controlling the direction of movement of the craft in accordance with said signals.

2. Apparatus of the class described comprising, in combination: means responsive to the earth's magnetic field to give a first electrical output which varies in accordance with the heading of dirigible aircraft; further means connected to said first named means and adjustable in accordance with a selected value of said heading to derive from said first output a second electrical output which varies in accordance with deviation of the heading of the craft from the selected value; stabilizing means, including a resistance-capacitance network, connected to said further means to supply a first signal which varies in accordance with the changing component only of said second output; radio responsive means giving a second signal which varies in accordance with departure of the craft from a selected ground path; and an automatic pilot connected to said stabilizing means and said radio responsive means for controlling the direction of movement of the craft in accordance with said signals.

3. Apparatus of the class described comprising, in combination: a gyroscopically stabilized compass for giving a first electrical output which varies in accordance with the heading of a dirigible aircraft; a bearing deviation indicator connected to said first named means, and adjustable in accordance with a selected value of said heading to give an indication of, and to derive from said first output a second electrical output which varies in accordance with, deviation of the heading of the craft from the selected value; stabilizing means, including a resistance-capacitance network connected to said indicator to supply a first signal which varies in accordance with the changing component only of said second output; an omni-bearing receiver giving a second signal which varies in accordance with departure of the craft from a ground path extending radially from a ground station in any selected direction; and an automatic pilot connected to said stabilizing means and said omni-bearing receiver for controlling the directional movement of the craft in accordance with said signals.

4. Apparatus of the class described comprising, in combination: means responsive to the earth's magnetic field; signal transmitting means actuated thereby for giving a signal which varies in accordance with the actual heading of a dirigible craft; means manually adjustable to indicate a desired heading for the craft which is parallel to a desired bearing of the craft from a ground station; signal receiving means connected to said signal transmitting means and arranged for actuation by said last named means to give a first output which is zero when the actual heading of the craft is that selected; means connected to said signal receiving means and energized by said first output for giving a first control signal which is zero when said output is constant and which varies in accordance with the change in said output only; radio responsive means giving a first further signal having a constant characteristic and a second further signal having a variable like characteristic which changes with change in the direction of the craft from the ground station; means connected to said radio responsive means and actuated by said manually adjustable means to modify said constant characteristic in accordance with said desired bearing; means connected to said last named means and said radio responsive means to give a second output which is zero when the craft is on a selected path where the bearing of the station from the craft is that desired, and which varies in accordance with departure of the craft from the selected path; means connected to said last named means for giving a second control signal which varies in accordance with said second output; and means energized with said first and second control signals for controlling the direction of movement of the craft in accordance therewith.

5. Apparatus of the class described, comprising, in combination: means responsive to the earth's magnetic field; signal transmitting means for giving a signal which varies in accordance with the actual heading of a dirigible craft; means manually adjustable to indicate a desired heading for the craft which is parallel to a desired bearing of the craft from a ground station; signal receiving means connected to said signal transmitting means and arranged for actuation by said last named means to give a first output which is zero when the actual heading of the craft is that selected; means connected to said signal receiving means and energized with said first output for giving a first control signal which is zero when said output is constant, and which varies in accordance with the rate of change of said output; radio responsive means, including selector means actuated by said manually adjustable means, for giving a second output which is zero when the craft is on a selected path where its bearing from the ground station is that desired, and which varies in accordance with departure of the craft from the selected path; means connected to said last named means for giving a second control signal which varies in accordance with said second output and the rate of change thereof; and means energized with said first and second control signals for controlling direction of movement of the craft in accordance therewith.

6. Apparatus of the class described comprising, in combination: means normally controlling the movement of a craft in accordance with the amount and sense of its departure from a selected path on which it has a selected bearing from a ground station, including manual means for selecting said bearing; means giving an alternating signal voltage which varies with deviation of the craft from a heading parallel to said selected bearing; means deriving from said signal voltage an alternating output voltage which varies in amplitude and reverses in phase with variation in the rate and reversal in the sense of any change in the amplitude of said alternating signal voltage; and means modifying the operation of said first named means in accordance with said first alternating output voltage.

7. Apparatus of the class described comprising, in combination: means normally controlling the movement of a craft in accordance with the amount and sense of its departure from a selected path which has a selected bearing from the ground station, including manual means for selecting said bearing; means giving an alternating signal voltage which varies with deviation of the craft from a heading parallel to said selected bearing; means, including a non-linear impedance device and a resistance-capacitance network, for deriving from said alternating signal voltage a unidirectional voltage which varies in magnitude and reverses in polarity with variation in the rate and reversal in the sense of any change in the amplitude of said alternating signal voltage; means energized with the unidirectional voltage derived by said last named means for supplying an alternating output voltage which varies in amplitude and reverses in phase with variation in the magnitude and reversal in the polarity of said unidirectional voltage; and means connected to said first named means for modifying the operation thereof in accordance with said alternating output voltage.

8. Apparatus of the class described comprising, in combination: first means giving a first alternating output voltage which varies in amplitude and reverses in phase in accordance with the amount and sense of the departure of a dirigible craft from a selected path which has a selected bearing from a ground station; second means giving an alternating signal voltage which varies with deviation of the craft from the heading parallel to said selected bearing; means, including a non-linear impedance device and a resistance-capacitance network, for deriving from said alternating signal voltage a uni-directional voltage which varies in magnitude and reverses in polarity with variation in the rate and reversal in the sense of any change in the amplitude of said alternating signal voltage; means energized with the uni-directional voltage derived by said last named means for supplying a second alternating voltage which varies in amplitude and reverses in phase with variation in the magnitude and reversal in the polarity of said unidirectional voltage; and means connected to said first and second means and energized with said first and second alternating voltages, for controlling the movement of the craft in accordance therewith.

9. Apparatus of the class described comprising, in combination: means normally controlling the movement of a craft in accordance with the amount and sense of its departure from a selected path passing through a fixed station, including first adjusting means operable to select the path in terms of its bearing at said station; means giving a signal representative of the heading error of the craft, including means giving an output representative of the actual heading of the craft and second adjustable means operative to modify said output, so that it becomes zero when the craft is on any selected heading; and means connected to the controlling means and the signal means for modifying the operation of the former in accordance with the varying component only of said signal.

10. Apparatus of the class described comprising, in combination: means normally controlling the movement of a craft in accordance with the amount and sense of its departure from a selected path passing through a fixed station, including first adjusting means operable to select the path in terms of its bearing at said station; means giving a signal representative of the heading error of the craft, including means giving an output representative of the actual heading of the craft and second adjusting means operative to modify said output, so that it becomes zero when the craft is on any selected heading; means connected to said both said adjusting means for simultaneous operation thereof; and means connected to the controlling means and the signal means for modifying the operation of the former in accordance with the varying component only of said signal.

References Cited in the file of this patent

UNITED STATES PATENTS

| | | |
|---|---|---|
| 1,958,258 | Alexanderson | May 8, 1934 |
| 2,415,430 | Frische et al. | Feb. 11, 1947 |
| 2,423,336 | Moseley | July 1, 1947 |
| 2,548,278 | Wirkler | Apr. 10, 1951 |
| 2,592,173 | Noxon et al. | Apr. 8, 1952 |
| 2,613,350 | Kellogg | Oct. 7, 1952 |
| 2,644,941 | Kellogg | July 7, 1953 |